(12) United States Patent
Sanderson et al.

(10) Patent No.: US 9,134,152 B2
(45) Date of Patent: Sep. 15, 2015

(54) BI-DIRECTIONAL FLOW METER WITH TWO FLUIDIC OSCILLATORS CONNECTED IN SERIES

(75) Inventors: Michael L. Sanderson, Milton Keynes (GB); Patrick C. J. Harvey, Bedfordshire (GB); Thomas P. Doyle, Bedfordshire (GB); Jon C. Scott, South Lanarkshire (GB)

(73) Assignee: Elster Metering Limited, Luton (GB)

( * ) Notice: Subject to any disclaimer, the term of this patent is extended or adjusted under 35 U.S.C. 154(b) by 632 days.

(21) Appl. No.: 13/063,714

(22) PCT Filed: Sep. 11, 2009

(86) PCT No.: PCT/GB2009/051180
§ 371 (c)(1),
(2), (4) Date: May 24, 2011

(87) PCT Pub. No.: WO2010/029372
PCT Pub. Date: Mar. 18, 2010

(65) Prior Publication Data
US 2011/0214762 A1    Sep. 8, 2011

(30) Foreign Application Priority Data

Sep. 12, 2008   (GB) .................................. 0816767.8

(51) Int. Cl.
| G01F 1/20 | (2006.01) |
| G01F 1/32 | (2006.01) |
| G01F 1/72 | (2006.01) |

(52) U.S. Cl.
CPC ................ *G01F 1/3227* (2013.01); *G01F 1/72* (2013.01); *Y10T 137/8376* (2015.04)

(58) Field of Classification Search
None
See application file for complete search history.

(56) References Cited

U.S. PATENT DOCUMENTS

| 3,902,367 | A | * | 9/1975 | Grant et al. ................. 73/861.19 |
| 4,495,823 | A | | 1/1985 | Rosaen |
| 4,610,162 | A | * | 9/1986 | Okabayashi et al. ...... 73/861.19 |
| 4,838,091 | A | * | 6/1989 | Markland et al. .......... 73/861.19 |
| 4,911,007 | A | * | 3/1990 | Churchill et al. .......... 73/861.19 |
| 4,976,155 | A | | 12/1990 | Challandes |

(Continued)

FOREIGN PATENT DOCUMENTS

| DE | 10119860 A1 | 10/2002 |
| EP | 0381344 A2 | 8/1990 |

(Continued)

OTHER PUBLICATIONS

British Search Report for British Application No. 0816767.8 dated Aug. 11, 2009.

(Continued)

*Primary Examiner* — Harshad R Patel
(74) *Attorney, Agent, or Firm* — Harness, Dickey & Pierce, P.L.C.

(57) ABSTRACT

A flow tube for a bidirectional flow meter includes a first flow chamber for generating a periodic pressure fluctuation whose frequency varies in dependence on the flow rate of fluid through the meter in a first direction. The flow tube also includes a second flow chamber for generating a periodic pressure fluctuation whose frequency varies in dependence on the flow rate of fluid through the meter in a second direction, opposite to the first direction. The first and second flow chambers are connected in series between an inlet port and an outlet port.

29 Claims, 5 Drawing Sheets

(56) References Cited

U.S. PATENT DOCUMENTS

| | | | | |
|---|---|---|---|---|
| 5,063,786 A | * | 11/1991 | Sanderson et al. | 73/861.19 |
| 7,383,740 B2 | * | 6/2008 | Krasilchikov et al. | 73/861.19 |
| 7,481,119 B2 | * | 1/2009 | Yang et al. | 73/861.19 |
| 8,136,413 B2 | * | 3/2012 | Sanderson | 73/861.19 |

FOREIGN PATENT DOCUMENTS

| | | |
|---|---|---|
| EP | 0868652 A1 | 10/1998 |
| EP | 1118841 A2 | 7/2001 |
| EP | 1394512 A1 | 3/2004 |
| GB | 2447425 A | 9/2008 |
| JP | 08240456 | 9/1996 |
| JP | 2002107199 A | 4/2002 |
| JP | 2003014510 A | 1/2003 |
| WO | 2005046426 A2 | 5/2005 |
| WO | 2008110766 A1 | 9/2008 |
| WO | 2008130554 A1 | 10/2008 |

OTHER PUBLICATIONS

Written Opinion and Search Report for Singaporean Patent Application No. 201101780-3, dated Apr. 23, 2012.
European Office Action for European Patent Application No. 09736641.3, dated Dec. 1, 2011.
International Search Report for International Patent Application No. PCT/GB2009/051180, dated Feb. 22, 2010.
Australian Examination Report for Application No. 2009290654 dated Jun. 13, 2014.
Chinese Office Action for Application No. 200980145040.2 dated May 9, 2012, and its English translation thereof.
Columbian Examination Report for Application No. 11-43550-2 dated Jun. 25, 2013, and its English translation thereof.
European Examination Report for Application No. 09736641.3 dated Oct. 8, 2012.
Singapore Search Report and Written Opinion for Application No. 201101780-3 dated Jun. 28, 2012.
Singapore Examination Report for Application No. 201101780-3 dated Mar. 7, 2013.
Great Britain Examination Report for Application No. GB0816767.8 dated Mar. 6, 2012.
Great Britain Search Report for Application No. GB0816767.8 dated Jan. 9, 2009.

* cited by examiner

116

BI-DIRECTIONAL FLOW METER WITH TWO FLUIDIC OSCILLATORS CONNECTED IN SERIES

TECHNICAL FIELD

The present invention relates to fluid flowmeters and in particular to bidirectional fluidic oscillator flow meters, such as municipal water flow meters. However, it is not limited to such applications.

BACKGROUND ART

Fluidic oscillators have been proposed as a basis for fluid, and especially liquid, flow meters. Fluidic oscillators have the advantage that they have no moving parts and therefore potentially have a longer operating life compared with mechanical flowmeters.

The relevant characteristic of a fluidic oscillator is that the frequency of oscillation of fluid flowing through the oscillator is related to the rate of fluid flow. The flow meter operates by measuring this frequency.

The above mentioned methods do not allow for accurate measurement of reverse flow through the meter.

It is an object of at least one of the preferred embodiments of the present invention to overcome or ameliorate at least one of the deficiencies of the prior art, or at least to provide a suitable alternative thereto.

SUMMARY OF THE INVENTION

Bi-Directional Flow Meter

According to the present invention, there is provided a flow tube for a bidirectional flow meter comprising:

a first means (for example in the form of a first flow chamber) for generating a periodic pressure fluctuation whose frequency varies in dependence on the flow rate of fluid through the meter in a first direction; and a second means (for example in the form of a second flow chamber) for generating a periodic pressure fluctuation whose frequency varies in dependence on the flow rate of fluid through the meter in a second direction, opposite to the first direction;

wherein said first and second generating means are connected in series between an inlet port and an outlet port.

By providing two generating means in series (preferably so that fluid flows into the inlet, through one of the means, then through the other of the means, and finally out of the outlet) the bidirectional flow meter can more accurately measure reverse flow, and can cope with incorrect installation of the meter.

Preferably, said first generating means and said second generating means are substantially identical. By providing identical generating means (preferably in a back to back arrangement) the requirement to install the meter in a particular orientation can be obviated.

Preferably, the two said generating means are arranged such that the inlets of the first and second generating means as defined when the fluid is flowing respectively in the first and second directions are connected together. By connecting the inlets together the flow meter can operate more effectively.

Preferably, the flow tube further comprises a throat positioned between the first and second generating means.

Preferably, the first generating means is adapted to condition the flow through the throat into the second generating means when the fluid is flowing in the second direction, and vice versa. By arranging that the first means conditions the flow for the second means an improvement in performance is engendered.

Preferably, the minimum cross-sectional area of the outlet port is greater than the cross-sectional area of the throat.

Preferably, the minimum cross-sectional area of the outlet port is greater than twice the cross-sectional area of the throat.

Preferably, each generating means comprises:
a diffuser;
a splitter post; and
two feedback channels.

As used herein the terms "diffuser", "splitter post" and "feedback channel" preferably refer to the relevant generating means when fluid is flowing in a forward direction (so the first direction for the first generating means and the second direction for the second generating means).

Preferably, the diffuser intake width is greater than the width of the throat. This can optimise flow conditions regardless of which direction the fluid is flowing in. Preferably, the diffuser intake width is between 1.4 and 1.8 times the width of the throat, preferably between 1.5 and 1.7 times, more preferably approximately 1.64 times. Preferably, the difference in intake width and throat width is between 2.0 mm and 2.5 mm, preferably approximately 2.3 mm.

Preferably, the diffuser comprises two, preferably elongate, bodies, and the angle between the two such bodies is adapted to substantially minimise the flow into the exits of the feedback channels.

Preferably, the diffuser comprises two bodies, and the angle between the two such bodies is between 25° or 28° and 35° or 38°, preferably between 30° and 34°, more preferably approximately 32°. This can improve performance.

Preferably, the shortest distance from the splitter post to the inlet of the generating means is between 6.0 and 7.0 times the width of the throat, preferably between 6.25 and 6.75, and more preferably approximately 6.4. Preferably, the shortest distance between the splitter post and the inlet to the generating means is between 22 mm and 24 mm, preferably approximately 23 mm.

Preferably, the splitter post is positioned at least partially within the exhaust of the diffuser. Preferably, the shortest distance between the splitter post and one of the bodies is between 0.9 and 1.1 times the shortest distance between the bodies, and preferably is substantially equal to that distance. This can reduce pressure drop.

Preferably, the flow tube further comprises an elongate body extending from the splitter post into the neck of the inlet/outlet of the meter. Such an elongate body, referred to elsewhere as a "paddle", can reduce interference between the two alternating flow paths of the flow tube.

Preferably, said elongate body extends between 1.5 and 3.5 times the width of the throat, preferably between 2 and 3 times, and more preferably approximately 2.5 times. Preferably, said elongate body extends between 5 mm and 15 mm, preferably 9 mm.

Preferably, wherein said elongate body is between 0.20 and 0.40 times the width of the throat, preferably between 0.25 and 0.35 times, and more preferably approximately 0.28 times.

Preferably, said elongate body is between 0.5 mm to 2 mm thick, preferably approximately 1 mm.

Preferably, the inlet/outlet of the meter comprises a substantially parallel section. The substantially parallel section is preferably longer than the width of the throat. It can improve the conditioning of the flow, for instance towards the throat, and for example by ensuring that flow is restricted from entering the 'exit' end of the feedback channel of the first chamber, causing possible oscillating performance issues.

Preferably, the inlet bore tapers to said substantially parallel section.

Preferably, the length of said substantially parallel section is between 2.0 and 2.5 times the width of the throat, preferably between 2.1 and 2.4 times, and more preferably approximately 2.22 times. Preferably, said parallel section is between 6 mm and 10 mm in length, preferably approximately 8 mm.

Preferably, for ease of manufacture, the transition between the tapered and parallel sections is filleted.

Preferably, the minimum cross-sectional area of the outlet port minus the (preferably greatest) cross-sectional area of the splitter post is greater than twice the cross-sectional area of the throat. Yet more preferably, the minimum cross-sectional area of the outlet port minus the (preferably greatest) cross-sectional area of the splitter post is greater than 2.01 times the cross-sectional area of the throat, more preferably greater than 2.05 times.

According to a yet further aspect of the present invention, there is provided a flow tube for a flow meter, comprising: means for generating a periodic pressure fluctuation whose frequency varies in dependence on the flow rate of fluid through the meter, wherein said means comprises: a diffuser; a splitter post; and two feedback channels; a throat positioned upstream from the diffuser; and an elongate body, positioned downstream of the splitter post, arranged to reduce the backflow around the downstream end of the splitter post.

Preferably, said elongate body extends from the splitter post into the neck of the inlet/outlet of the meter.

Preferably, said elongate body extends between 1.5 and 3.5 times the width of the throat, preferably between 2 and 3 times, and more preferably approximately 2.5 times.

Preferably, said elongate body extends between 5 mm and 15 mm, preferably 9 mm.

Preferably, said elongate body is between 0.20 and 0.40 times the width of the throat, preferably between 0.25 and 0.35 times, and more preferably approximately 0.28 times.

According to a yet further aspect of the present invention, there is provided a flow tube for a flow meter, comprising: means for generating a periodic pressure fluctuation whose frequency varies in dependence on the flow rate of fluid through the meter, wherein said means comprises: a diffuser; a splitter post; and two feedback channels; and a throat; wherein the minimum cross sectional area of an outlet port is greater than the cross-sectional area of the throat.

Preferably, the minimum cross-sectional area of the outlet port minus the cross-sectional area of the splitter post is greater than twice the cross-sectional area of the throat. Yet more preferably, the minimum cross-sectional area of the outlet port minus the cross-sectional area of the splitter post is greater than 2.01 times the cross-sectional area of the throat, preferably greater than 2.05 times.

Correction Methodology

According to a further aspect of the present invention, there is provided a method of determining the flow rate through a pulse output flow meter, comprising:
determining whether each output pulse is valid or not; and
determining the flow rate in dependence on each valid output pulse.

Preferably, the method further comprises:
determining the flow rate in dependence on each invalid output pulse; and
combining the flow rates determined in dependence on the valid and invalid output pulses.

The combining may be simple summing or may be for example a weighted sum of the flow rates determined for the valid and invalid pulses, with the valid pulses preferably contributing more than the invalid pulses.

Preferably, the method further comprises:
determining a statistical parameter (for example an average) in dependence on a plurality of output pulses; and
determining the flow rate in dependence on each invalid output pulse, utilising the statistical parameter.

This may yield a more accurate output of the meter over a greater range.

According to a further aspect of the present invention, there is provided a method of determining the flow rate through a pulse output flow meter, comprising:
determining whether each output pulse is valid or not;
determining the flow rate in dependence on each valid output pulse;
determining a statistical parameter (for example an average) in dependence on a plurality of output pulses;
determining the flow rate in dependence on each invalid output pulse, utilising the statistical parameter; and
combining the flow rates determined in dependence on the valid and invalid output pulses to determine the total flow rate.

Preferably, the flow rate is determined in dependence on pulse separation period. This may be an actual pulse separation period and/or a statistically derived such period. The flow rate may be determined via a look-up table, in which case preferably interpolation is utilised between the two closest points in the look-up table to obtain the flow rate.

Preferably, the flow rate based on invalid pulses is determined by utilising the statistical parameter in the look-up table to determine a flow rate, and utilising the current pulse separation period normalised by the statistical parameter to correct the flow rate found in the look-up table.

The statistical parameter may be the median pulse separation period of the plurality of output pulses. Alternatively, it may be the mean of a plurality of median pulse separation periods. Again, it may be the mean pulse separation period of the plurality of output pulses. Yet again, it may be the mode pulse separation period of the plurality of output pulses.

Preferably, more than 3 or 6, and preferably less than 12 or 15, more preferably 9, pulses are utilised in determining the statistical parameter.

Preferably, the step of determining whether each output pulse is valid or not comprises:
determining the mean pulse separation period of a plurality of output pulses; and
determining whether the current pulse separation period is within a predetermined range about the mean pulse duration;
wherein said pulse is determined as valid if it is within said predetermined range.

Preferably, more than 3 or 6, and preferably less than 12 or 15, more preferably 9, pulses are utilised in determining said mean.

Preferably, said range is between −20% and +20%, −15% and +15%, or −12.5% and 12.5% of the mean pulse duration.

Flow Direction Detection

According to a further aspect of the present invention, there is provided a method of detecting the flow direction in a pulse output bi-directional flow meter, comprising:
analysing a plurality of output pulses of a first sensing device;
analysing a plurality of output pulses of a second sensing device; and
determining the flow direction in dependence on said two analyses.

Hence the direction of flow can quickly be determined.

Preferably, the method further comprises determining whether the output pulses of each sensor device are valid or not.

Preferably, said step of determining whether the output pulses of each sensor device are valid or not comprises:

determining the average (for example mean) pulse separation period of a plurality of output pulses; and determining whether the current pulse separation period is within a predetermined range about the average pulse duration;

wherein said pulse is determined valid if it is within said predetermined range.

Preferably, the method further comprises:

incrementing a first register, associated with a first direction of flow, if a pulse from the first sensor device is valid, and decrementing a second register, associated with a second direction of flow; and incrementing the second register if a pulse from the second sensor device is valid, and decrementing the first register;

wherein the direction of flow is determined by the register with the larger count.

Preferably, each register is incremented only until a threshold value is attained. This can permit a quick determination of a change in flow direction. Said threshold is preferably more than 3 or 6, and preferably less than 12 or 15, more preferably 9.

Preferably, the decrement is proportional to the increment. Preferably, the decrement is greater than, preferably greater than twice, or four or ten times, the increment.

Preferably, the method further comprises clearing both registers when no output is detected for a period of time. Preferably, said period of time is dependent on the pulse separation period before no output was detected. Preferably, said period of time is a multiple of the pulse separation period before no output was detected, said multiple being preferably more than 1 or 3, preferably less than 7 or 9, and more preferably 5.

The invention extends to a computer program product comprising software code adapted, when executed on a data processing apparatus, to perform any of the steps as aforesaid.

The invention extends to:

A flow tube substantially as herein described with reference to the accompanying drawings.

A method of determining the flow rate through a pulse output flow meter substantially as herein described with reference to the accompanying drawings.

A method of detecting the flow direction in a pulse output bi-directional flow meter substantially as herein described with reference to the accompanying drawings.

The invention extends further to a bidirectional flow meter incorporating a flow tube as aforesaid.

Preferably, the meter further comprises at least one sensor for sensing said fluid pressure fluctuations.

Preferably, the sensing means is a piezoelectric device.

Preferably, the sensing means is electrically connected to an electric counter configured to interpret an output from the sensing means which relates to the periodic pressure fluctuation.

According to a further aspect of the present invention, there is provided apparatus for determining the flow rate through a pulse output flow meter, comprising:

means (for example in the form of a processor or other circuit, and associated memory) for determining whether each output pulse is valid or not; and means (for example in the form of a processor or other circuit, and associated memory) for determining the flow rate in dependence on each valid output pulse.

According to a further aspect of the present invention, there is provided apparatus for determining the flow rate through a pulse output flow meter, comprising:

means (for example in the form of a processor or other circuit, and associated memory) for determining whether each output pulse is valid or not;

means (for example in the form of a processor or other circuit, and associated memory) for determining the flow rate in dependence on each valid output pulse;

means (for example in the form of a processor or other circuit, and associated memory) for determining a statistical parameter (for example an average) in dependence on a plurality of output pulses;

means (for example in the form of a processor or other circuit, and associated memory) for determining the flow rate in dependence on each invalid output pulse, utilising the statistical parameter; and means (for example in the form of a processor or other circuit, and associated memory) for combining the flow rates determined in dependence on the valid and invalid output pulses to determine the total flow rate.

Preferably, the flow rate is determined in dependence on pulse separation period. More preferably, the flow rate is determined via a look-up table. Yet more preferably, the flow rate based on invalid pulses is determined by utilising the statistical parameter in the look-up table to determine a flow rate, and utilising the current pulse separation period normalised by the statistical parameter to correct the flow rate found in the look-up table.

Preferably, the statistical parameter is the median pulse separation period of the plurality of output pulses.

Preferably, the statistical parameter is the mean of a plurality of median pulse separation periods.

Preferably, the statistical parameter is the mean pulse separation period of the plurality of output pulses.

Preferably, the statistical parameter is the mode pulse separation period of the plurality of output pulses.

Preferably, more than 3 or 6, and preferably less than 12 or 15, more preferably 9, pulses are utilised in determining the statistical parameter.

Preferably, the means for determining whether each output pulse is valid or not:

determines the mean pulse separation period of a plurality of output pulses; and determines whether the current pulse separation period is within a predetermined range about the mean pulse duration;

wherein said pulse is determined as valid if it is within said predetermined range.

Preferably, more than 3 or 6, and preferably less than 12 or 15, more preferably 9, pulses are utilised in determining said mean. More preferably, said range is between −20% and +20%, −15% and +15%, or −12.5% and 12.5% of the mean pulse duration.

According to a further aspect of the present invention, there is provided apparatus for detecting the flow direction in a pulse output bi-directional flow meter, comprising:

means (for example in the form of a processor or other circuit, and associated memory) for analysing a plurality of output pulses of a first sensing device;

means (for example in the form of a processor or other circuit, and associated memory) for analysing a plurality of output pulses of a second sensing device; and means (for example in the form of a processor or other circuit, and associated memory) for determining the flow direction in dependence on said two analyses.

Preferably, the apparatus further comprises means for determining whether the output pulses of each sensor device are valid or not.

Preferably, the means for determining whether the output pulses of each sensor device are valid or not:

determines the average pulse separation period of a plurality of output pulses; and determines whether the current pulse separation period is within a predetermined range about the average pulse duration;

wherein said pulse is determined valid if it is within said predetermined range.

Preferably, the apparatus further comprises means for incrementing a first register, associated with a first direction of flow, if a pulse from the first sensor device is valid, and decrementing a second register, associated with a second direction of flow; and means for incrementing the second register if a pulse from the second sensor device is valid, and decrementing the first register; wherein the direction of flow is determined by the register with the larger count.

Preferably, each register is incremented only until a threshold value is attained. Yet more preferably, said threshold is preferably more than 3 or 6, and preferably less than 12 or 15, more preferably 9.

Preferably, the decrement is proportional to the increment. Yet more preferably, the decrement is greater than, preferably greater than twice, or four or ten times, the increment.

Preferably, the apparatus further comprises means for clearing both registers when no output is detected for a period of time. Yet more preferably, said period of time is dependent on the pulse separation period before no output was detected.

Preferably, said period of time is a multiple of the pulse separation period before no output was detected, said multiple being preferably more than 1 or 3, preferably less than 7 or 9, and more preferably 5.

The invention also provides a computer program and a computer program product comprising software code adapted, when executed on a data processing apparatus, to perform any of the methods described herein, including any or all of their component steps.

The invention also provides a computer readable medium having stored thereon the computer program as aforesaid.

The invention extends to methods and/or apparatus substantially as herein described with reference to the accompanying drawings.

According to a yet further aspect of the present invention, there is provided a bidirectional flow meter incorporating apparatus for detecting the flow direction in a pulse output bi-directional flow meter, further comprising means for measuring flow rate, said means being adapted to measure flow rate in dependence upon the determined flow direction and a measure of flow rate in such determined direction.

Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

BRIEF DESCRIPTION OF THE DRAWINGS

Preferred embodiments of the invention will now be described, by way of example only, with reference to the accompanying drawings in which.

DETAILED DESCRIPTION OF THE PREFERRED EMBODIMENTS

Figure 1:
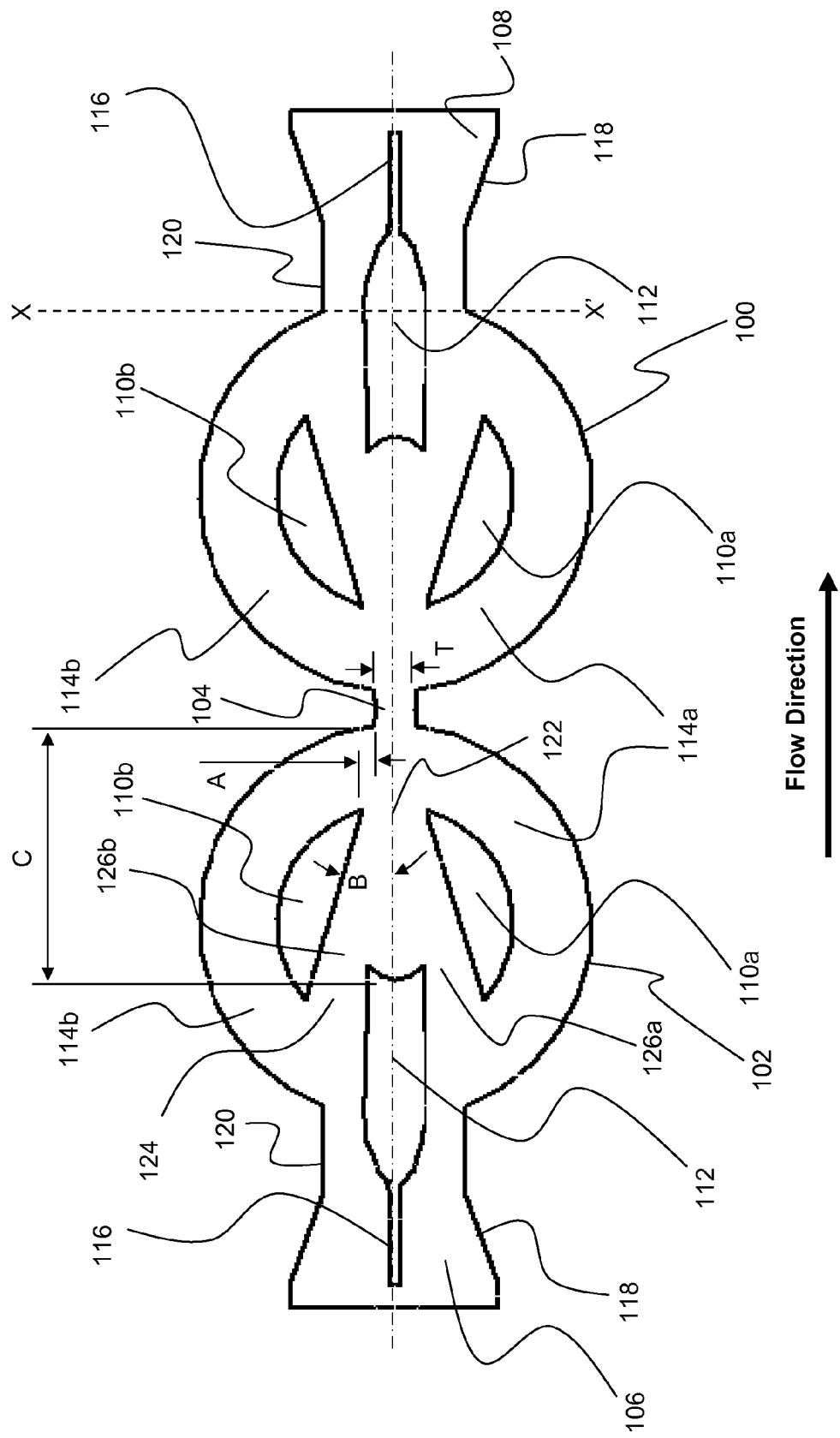
FIG. 1 is a section plan view of a bidirectional fluidic oscillator flow tube.

FIG. 1 shows a section plan view of a bidirectional fluidic oscillator flow tube. The flow tube comprises two fluidic oscillators, 100 and 102, connected together via a throat 104, an inlet 106 and an outlet 108. The tube is sealed in a housing (not shown).

The two fluidic oscillators 100 and 102 are connected in series inlet to inlet. Each fluidic oscillator comprises a flow chamber with a diffuser comprised of two walls 110a and 110b, a splitter post 112 and two feedback channels 114a and 114b. The splitter post includes a main body portion with two ends, one end shaped as a bullet nose and one as a fish tail. In addition, the splitter post comprises a paddle 116 attached to the bullet nose shaped end of the splitter. The paddle is in the form of an elongate body and extends into the inlet/outlet portions of the meter. The inlet 106 and outlet 108 each comprise a tapered portion 118 leading to a parallel portion 120. The cross section of the inlet 106 and outlet 108 bores is substantially rectangular with filleted corners.

The overall width of the bidirectional meter is approximately 110 mm from the face of the inlet to the face of the outlet; however, it should be understood that the meter can be scaled up or down depending on specific requirements such as the range of flow rates/volumes that the meter will encounter in use. The specific elements of one version of the meter will now be described, with preferred dimensions provided based on a meter size of 110 mm width and 15 mm bore connectors—as shown in Table 1.0.

The throat width T is 3.6 mm, and the height of the throat is 19 mm; the flow meter described herein can be scaled with reference to the throat width T.

The cross section of the inlet 106 and outlet 108 bores is substantially rectangular, 13.2 mm×19 mm, with filleted corners of radius 6 mm.

The diffuser has an intake 122 and an exhaust 124. The diffuser walls 110a and 110b separate the main channels 126a and 126b from the feedback channels 114a and 114b respectively. The diffuser walls are offset from the throat outer edge by a distance A. Distance A can be between 1.0 mm and 1.25 mm, the preferred offset distance A is 1.15 mm. Therefore, given the throat width T of 3.6 mm the intake width of the diffuser is between 5.6 mm and 6.1 mm, the preferred intake width is 5.9 mm. When scaled to the width of the throat T, the width of the diffuser intake is between 1.4 and 1.8, preferably approximately 1.64 times the throat width. The width of the exhaust of the diffuser 124 is arranged such that the cross sectional area past the splitter post is approximately equal to that of that of the intake.

The diffuser wall angle B, measured between the flow meter centreline and the inner edge of the diffuser wall, can be between 14.0° and 17.5°, the preferred angle is 16°. The diffuser wall angle is arranged to minimise the pressure drop across the meter.

The splitter post 112 is positioned within the exhaust of the diffuser 124, between 22 mm and 24 mm from the edge of the throat, the preferred distance is approximately 23 mm, distance C. When scaled to the throat width the splitter post is positioned at a distance of between 6.0 and 7.0 times the throat width, preferably approximately 6.4 times.

The paddle 116 attached to the bullet nose shaped end of the splitter post 112 is between 5 mm and 15 mm in length, preferably approximately 9 mm. The width of the paddle 116 is between 0.5 mm and 2.0 mm, preferably approximately 1.0 mm. Again, when scaled to the throat width the paddle length is between 1.5 and 3.5 times the throat width, preferably approximately 2.5 times, and the paddle width is between 0.20 and 0.40 times the throat width, preferably approximately 0.28.

The housing, and flow tube are preferably manufactured from an appropriate rubber, plastic or resin material.

TABLE 1.0

| Feature | Representative Dimension |
|---|---|
| Throat to leading edge of Diffuser Wall (a) | Offset (1.15 mm) |
| Diffuser Wall angle (b) | 16 deg. |
| Throat to Splitter Post distance-front edge (c.) | 23 mm |
| Throat | 3.6 × 19.0 |
| Inlet Port geometry | Lofted from bore dia to a 8 mm long rectangular profile |
| Paddle Feature | Long thin profile (L = 9: W = 1) |
| Splitter Post profile | Bullet nose with fish tail |
| Inlet/Outlet Cross Sectional Area | 13.2 × 19 (with R6.0) NB. Manufacturable & feasible |

Figure 2A:
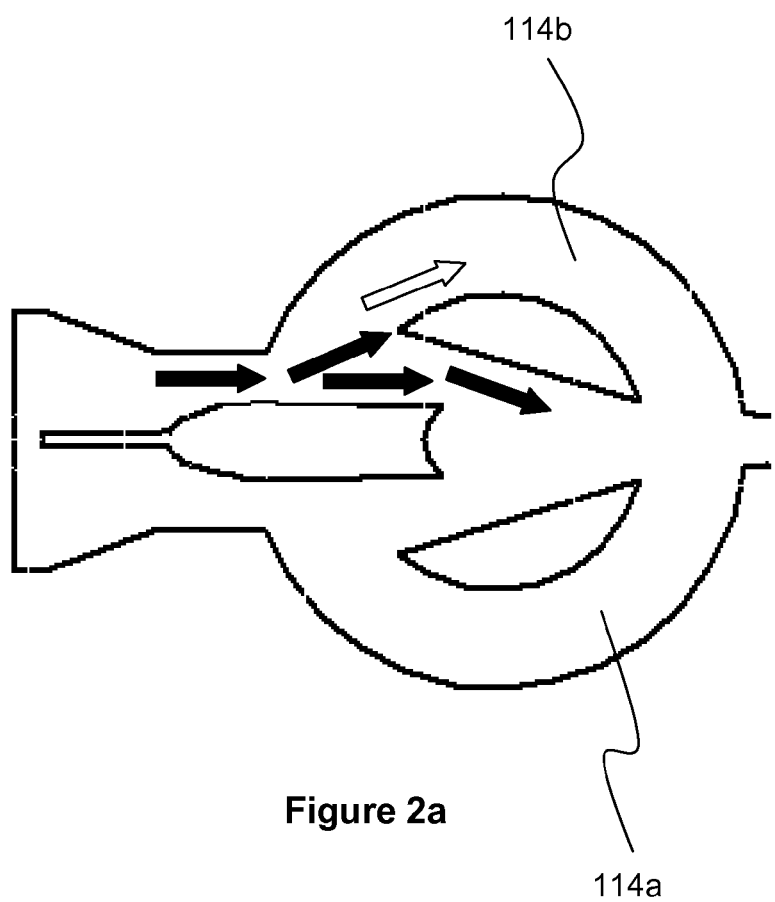
FIG. 2a is a section plan view of one side of a bidirectional fluidic oscillator flow tube indicating flow paths in the inlet.

In use, the flow from the inlet 106 to the outlet 108 proceeds as follows. The flow first passes through the fluidic oscillator 102, in the opposite direction to that which would produce fluidic oscillation. The fluidic oscillator 102 acts to condition the flow into the fluidic oscillator 100. The diffuser walls 110a and 110b of the fluidic oscillator 102 direct the flow towards the throat 104. In addition, the diffuser walls 110a and 110b are arranged such that the flow past the walls into the exit of the feedback channels 114a and 114b is minimised, and so prevents flow from the feedback channel from disrupting the main jet at the throat. This also minimises the low-frequency modulation in the non-measuring fluidic oscillator. FIG. 2a shows the flow path from the inlet and into the diffuser, acting as a flow conditioner. The solid arrows designate the preferred flow path, and the outlined arrow designates the flow into the exit of the feedback channel that is not desired. Increasing the diffuser wall angle decreases the amount of flow entrained into the feedback channel. However, the pressure drop across the meter will increase with increasing diffuser wall angle, and so the diffuser wall angle is optimised for pressure drop and fluid flow through the meter.

Figure 2B:
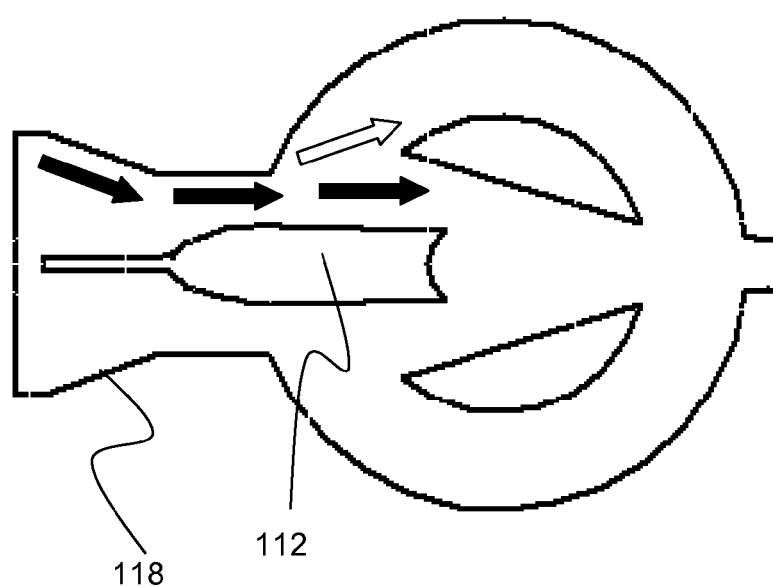
FIG. 2b is a section plan view of one side of a bidirectional fluidic oscillator flow tube indicating further flow paths in the inlet.

FIG. 2b shows the flow path in the inlet proceeding from the tapered portion 118, into the parallel portion 120, and then on towards the diffuser. The parallel portion of the inlet is preferably arranged to condition the flow and further decreases the amount of flow into the exit of the feedback channels 114a and 114b.

The conditioned flow exits the diffuser intake 122 and enters the throat 104, at which point the majority of the flow will pass through one of the two main channels 126a and 126b and through the outlet 108. Two feedback channels 114a and 114b are respectively associated with the two main channels 126a and 126b.

However, some fluid flowing through the fluidic oscillator 100 will have a tendency to flow along a main channel wall 110a, due to the Coanda effect. It will then tend to flow around the wall and into the associated feedback channel 114a before returning to contact the inlet fluid stream (at throat 104). This contact forces the inlet fluid stream to pass through the other main channel 124b, where some fluid will then flow along channel wall 110b, again due to the Coanda effect, and into feedback channel 114b. The fluid then returns to contact the inlet fluid stream and push it to flow through the first mentioned main channel 126a, and so on. It is this oscillation between the two main channels 126a and 126b and feedback channels 114a and 114b which drives the fluidic oscillator 100. When the flow is reversed the equivalent flow pattern occurs in fluidic oscillator 102, and fluidic oscillator 100 acts as a flow conditioner as the fluidic oscillators 100 and 102 are identical.

The splitter post is preferably arranged so that the cross sectional area between the splitter post and each diffuser wall is substantially equal to, or greater than, that of the diffuser intake cross sectional area, and/or the throat 104 cross sectional area. Therefore, when the majority of the flow is passing through one main channel due to the Coanda effect, the pressure drop across the meter is minimised.

Figure 3:
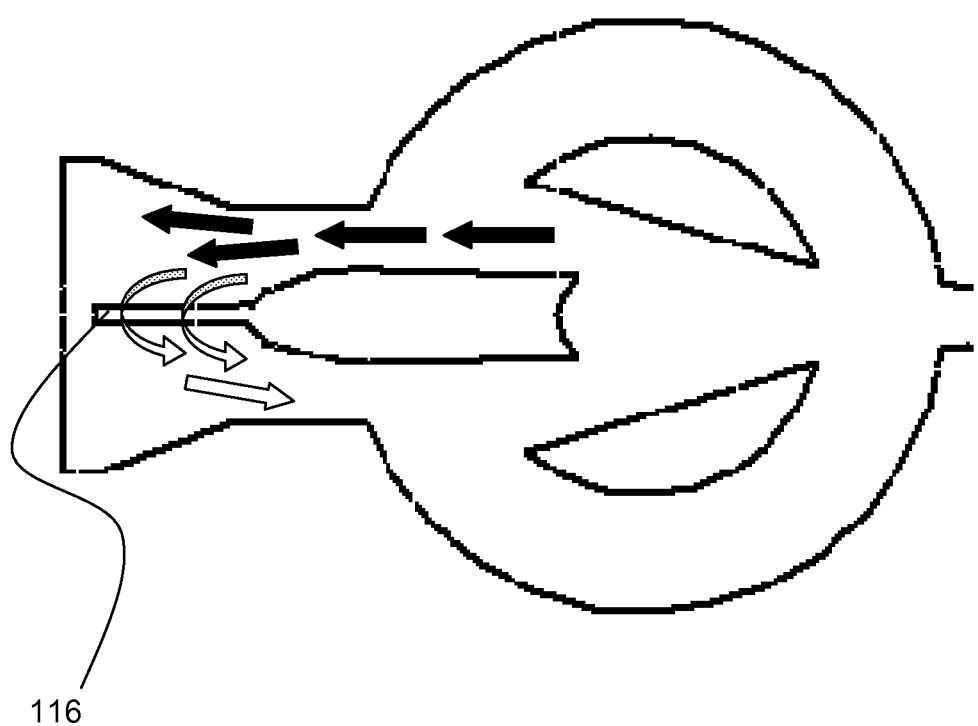
FIG. 3 is a section plan view of one side of a bidirectional fluidic oscillator flow tube indicating flow paths in the outlet.

As shown in FIG. 3, the paddle feature is preferably included to reduce the outlet flow of fluid from re-circulating around the splitter post and introducing additional oscillations within the measuring meter. Therefore, the paddle feature increases the accuracy of the meter. The paddle extends into the outlet bore of the meter and allows the meter to remain small in size by reducing the amount of flow instability around the splitter post.

In an alternative embodiment, a pair of vortex shedding flow meters, such as Karman vortex meters, can be utilised instead of the pair of fluidic oscillators as described. In this embodiment, the flow meter comprises a chamber, having an inwardly tapered fluid inlet and a fluid outlet. Two fluid flow channels are defined in the chamber from to the inlet to the outlet on either side of a divider. The divider comprises a sensor in the form of a piezoelectric sensor or the like. A bluff body is provided upstream of the divider.

When fluid entering the chamber via the inlet flows past the bluff body, vortices are formed on either side of the bluff body, and flow down each channel. The vortices formed are known as Karman vortices, and are alternately shed from each respective side of the bluff body in proportion to the rate of fluid flow through the flow meter. Due to the alternate shedding of vortices, a pressure difference is provided in the fluid across the two channels. This pressure difference is sensed by the sensor, and is used to count the rate of vortex production, and hence to determine the rate of fluid flow through the flow meter.

The above described flow tubes when utilised in a flow meter have sensors in each fluidic oscillator to detect the oscillations. Typical sensors are electro-magnetic field EMF sensors that detect the EMF generated by the oscillating flow passing through a magnetic field. However, other sensors, such as piezoelectric sensors, can be utilised. The flow tube oscillation frequency is dependent on the flow rate through the meter, and therefore the flow rate can be determined by measuring the oscillation frequency. The typical flows that the above described meter can measure are between 10 liters/hour and 3125 liters/hour.

Correction Methodology

The nature of the fluidic oscillator flow meter and the sensing system means that under certain conditions such as mechanical vibration, or at certain flow rates, there will be disruption to the theoretical oscillating pattern of signals from the oscillator. To combat these problems a number of methods have been developed which enables correction of even significant disturbances. The following will describe those methods in detail.

Validation

Validation is a technique used to check that the output pulses are real flow and not just a few random pulses due to noise. Validation is accomplished by comparing successive pulse separation periods; output pulses due to real flow are represented by highly repetitive pulses. A validated pulse is one which matches with the typical pulses which are occurring, an invalid pulse is one which is atypical. Validation works by acquiring a value representing an average pulse separation period and setting typically a 25% window against which each new pulse is tested. Flow is determined to be active once a number of matching pulses have been recognised. For example, a rolling 9 pulses can be utilised in determining the current average pulse separation period. This allows any change in flow rate to be accounted for.

Flow Rate Calculation

Using the pulse separation period measurement the period of the pulse is determined, a point above and below on the lookup table are determined and using linear interpolation a specific volume per pulse is calculated as each pulse is processed. This is directly related to the flow rate through the meter.

Basic Pulse Accumulation

The 'Basic Pulse Accumulation' is the initial method of counting pulses and accumulating a volume for each pulse, and thereby calculating the flow rate; this is the general method for known pulse output details. However, any irregular pulses that occur, such as missing pulses and double pulses, will cause errors in the volume accumulated, as:

Accumulate Volume=$N$×Volume per Pulse

Fractional Pulse Inclusion

The validation process described above is utilised to determine valid and invalid pulses. The flow rate due to valid pulses is determined using the 'Basic Pulse Accumulation' method. However, the flow rate due to invalid pulses is determined in the following way. A statistical parameter, such as the median, mean or mode is determined in dependence on the pulse separation periods of all valid output pulses. It is preferable to utilise the median pulse separation period for the previous 9 output pulses. Utilising the median effectively filters out the least desirable pulses, i.e. those with either a very long or very short pulse separation period compared to the theoretical pulse repetition frequency. The median pulse separation period is then utilised to calculate the specific volume for that period using the look-up table. In order to correct for missing and double pulses the current pulse separation period of the invalid pulse is normalised utilising an average, such as the median, mean or mode, pulse separation period, as shown below:

$$Acc \text{ Volume} = (N^{Valid} \times \text{Vol per pulse}) + \frac{(N^{Invalid} \times \text{Pulse Period} \times \text{Vol per Pulse})}{\text{Median Pulse Period}}$$

NB Vol per pulse is the volume of the median pulse at that flow rate

Therefore, the flow rates determined in dependence on the valid pulses and on the invalid pulses are combined to determine the overall flow rate. This reduces the errors caused by missing and double pulses significantly.

In addition a rolling average of the median pulse can be utilised in the above formula. This reduces the error still further.

Flow Direction Detection

When a pulse output flow meter (for example a fluidic oscillator) is run in a reverse direction the oscillator or system for sensing the oscillations will often produce pulses that are not of the same frequency or repeatability as when the flow meter is run in the forward direction.

In a unidirectional meter this can be misinterpreted as forward flow of a wrong magnitude. In a bidirectional meter this can produce an uncertainty in the direction of flow especially at starting and stopping of flows and at times when the sensing system is subject to high noise levels (for example during vibration).

For the bidirectional flow meter consisting of two "back to back" single flow meters (as described above), a register is allocated to each fluidic oscillator. This register is incremented on a valid pulse from the associated flow meter. The fluidic oscillator in the forward direction has a higher frequency than the fluidic oscillator in the reverse direction, and so the register with the higher value indicates the direction flow. (Valid pulses are determined as described above.)

It is desirable to prevent the forward and reverse direction registers from continuing to rise indefinitely, since if/when the flow direction changes it will take significant time for the register values to adjust to the new direction of flow.

Hence, when a valid pulse increments the register for one direction the other register for the opposite direction is decremented at the same time (this could be weighted such that it decrements as some function of the increments, e.g. at twice the rate, or 5 times the rate, etc). This results in the ability to use smaller registers and to ensure that there is never a situation in which both registers are full.

When the flow meter is measuring flow in a forward direction valid pulses increment a forward direction register up to a maximum of typically 15 counts. A valid reverse pulse decrements the forward register and increments the reverse register by one unit up to a maximum of typically 15. (Hence the Required Register Capacity is Known.)

The smaller the register the quicker the meter will respond to changes in the flow direction but the less robust it will be to eliminating noise. As stated above, a preferred register size is able to handle a count of 15. The size of the registers and the function for decrementing them is tuned to the exact requirements of the specific flow meter, and application. Both registers are cleared when no activity is detected in either direction for a certain amount of time.

As described above, a validation algorithm is applied to each pulse, and only valid pulses increment the register. As the reverse flow will likely produce random, non-rhythmic, pulses the validation process increases the accuracy of detecting the correct flow direction.

Figure 4:
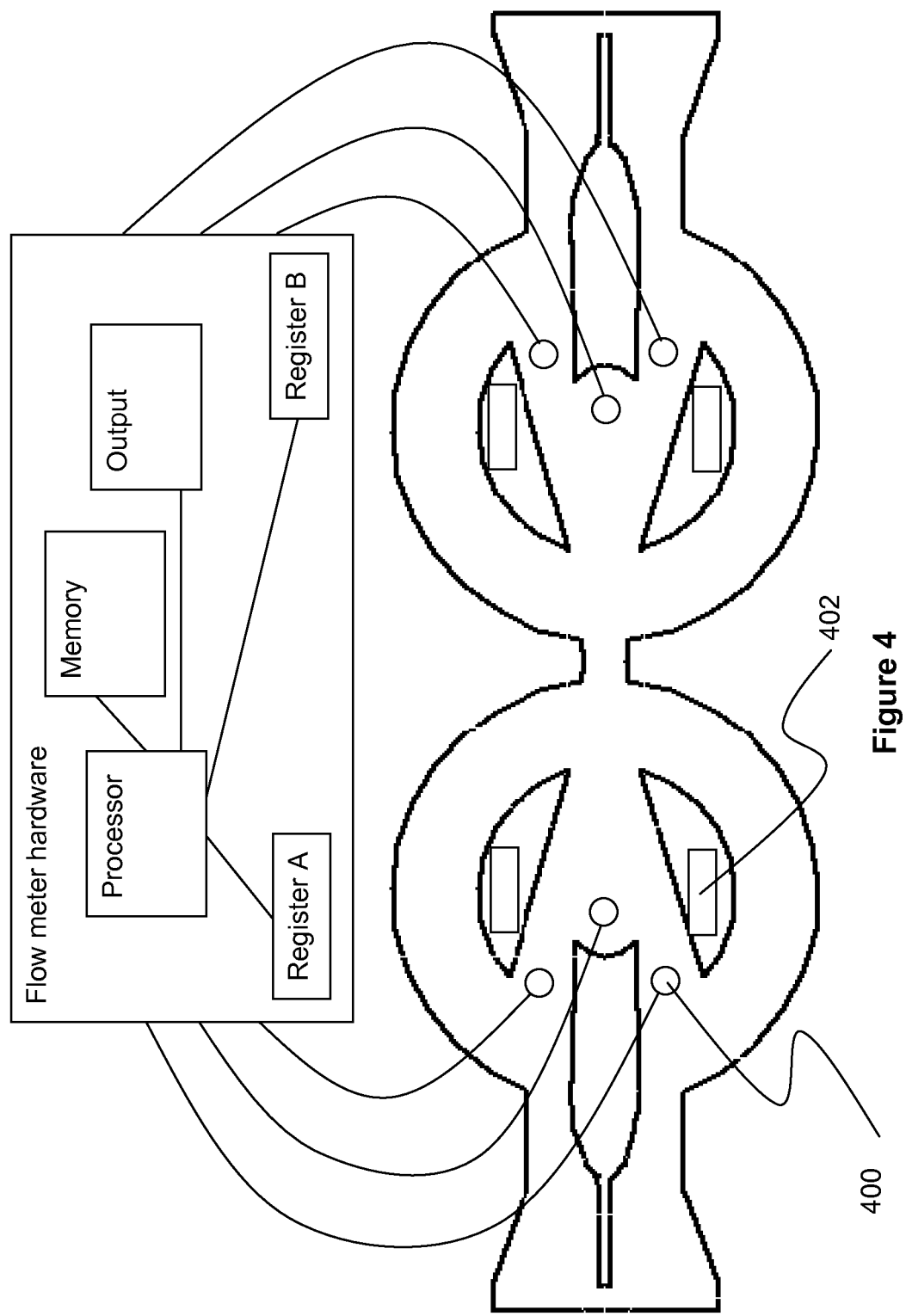
FIG. 4 show a schematic of a flow meter incorporating fluidic oscillators according to an embodiment of the present invention.

The above described correction and flow direction methods are implemented using the flow meter processor, as shown in FIG. 4. The flow direction detection method is implemented prior to measuring the fluid flow rate. This enables the processor to determine the correct sensor set to use when determining the flow rate, as using the sensor set of the fluidic oscillator that has a backward flow will result in errors.

Port Profile

In certain cases the flow of fluid through the flow tube of the flow meter may result in a noticeable, and unacceptable, pressure drop or head loss along the length of the flow tube. In common engineering practice, one way to avoid head loss across a fluid system is to ensure the cross-sectional area across the various parts of the fluid flow is approximately the same. However, in the highly turbulent flow conditions in which the described flow meter operates it has been found that the head loss is improved by providing that the minimum cross-sectional area of the outlet port 108 (which includes the parallel portion 120) has a larger cross-sectional area than that of the throat 104. Surprisingly, the increase in cross sectional area is required in order to minimise the head loss associated with that section. In particular, the cross-sectional area on each side of the splitter post in the parallel portion 120 is ideally equal to or greater than the cross-sectional area of the throat 104 (since the majority of the flow will be on one side or other of the splitter post at any one time). Preferably, this feature is used in conjunction with the paddle feature 116 described above.

More specifically, and referring to FIG. 1, the cross-sectional area of the substantially parallel portion 120 of the flow tube about each side of the splitter post 112 and paddle feature 116 is made greater than that of the throat 104. The relative increase in cross-sectional area of parallel portion 120 of the flow tube need not be large; only enough to reduce the head loss experienced at the outlet 108 so that it is no longer the source of the dominant head loss in the system. Since the bidirectional flow meter is essentially symmetrical, the increase in the outlet port cross-sectional area means that the inlet port cross-sectional area is also increased.

Figure 5:
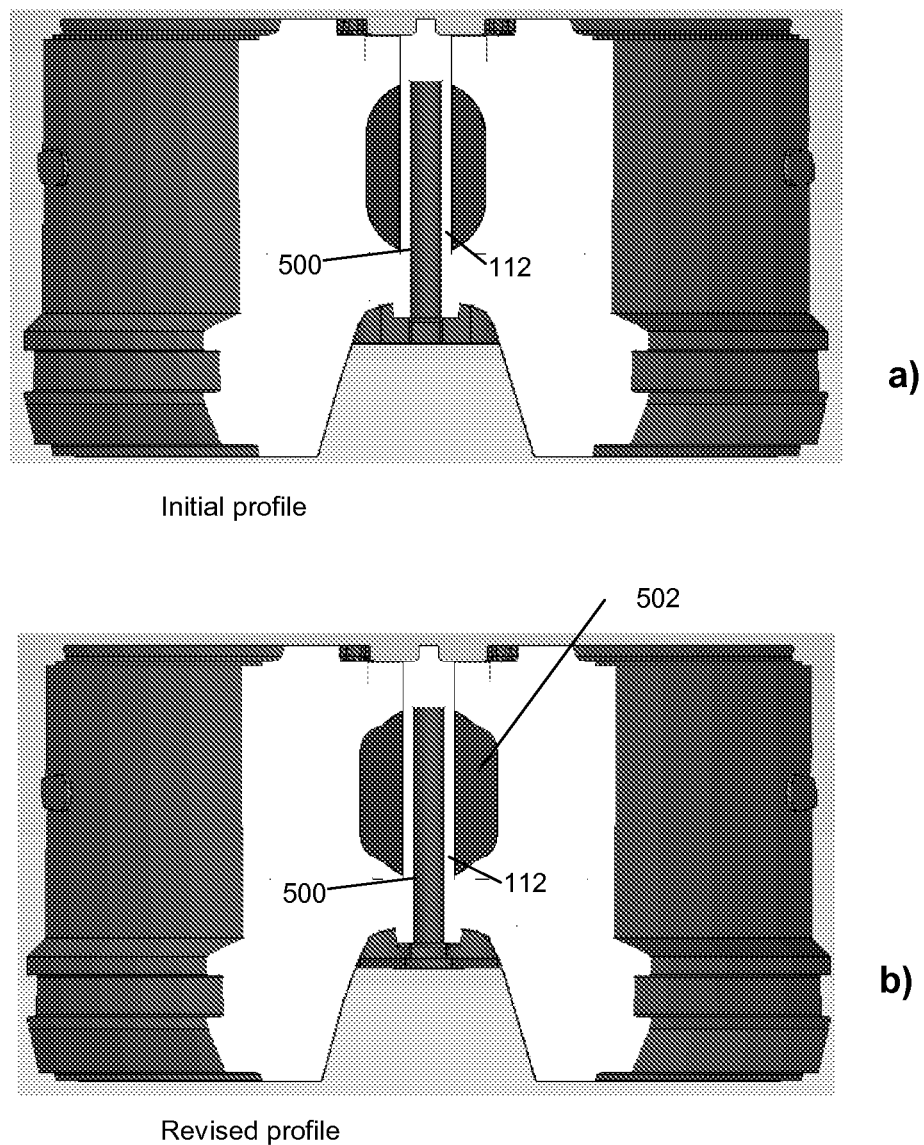
FIG. 5 show a side elevation cross-sectional view of alternative versions of an embodiment of the bidirectional fluidic oscillator flow tube.

FIG. 5 show side elevation cross-sectional or profile views taken along the line X-X' shown in FIG. 1 of two versions of an embodiment of the bidirectional fluidic oscillator flow tube: FIG. 5 a) shows an initial version with an unmodified cross-section; FIG. 5 b) shows a revised version with a larger outlet port 108 as described above. As can be seen from FIG. 5 b) the cross-section of the flow area 502 is substantially rectangular, with a width of approximately 15.2 mm and a height of 19 mm.

In this embodiment, magnets 402 positioned within the diffuser walls are replaced by a single magnet 500 positioned within the splitter post 112.

Table 2 shows the results of measurements of the approximate pressure drop or head loss as measured including filters at the inlet 106 and outlet 108 at a test flowrate of 2500 lt/hr (Q3) for the initial and revised profile geometries. In both cases, the throat cross-sectional area is approximately 69 mm² (3.62×19.0 mm); the ratio given represents the smallest cross-sectional area of the outlet along the line X-X' in FIG. 1 divided by the cross-sectional area of the throat 104 (as just given).

TABLE 2

| | Outlet area/throat area | Pressure drop (Bar) |
|---|---|---|
| Initial | 0.82 | 0.7 |
| Revised | 1.03 | 0.5 |

As can be seen from Table 2, increasing the cross-sectional area of the outlet port 108 (or more specifically, that of the parallel portion 120) reduces the head loss in the flow meter. In particular, increasing the ratio of cross-sectional area of outlet to that of the throat as shown reduces the head loss from 0.7 to 0.5 bar. The details provided above are a specific example of a 15 mm meter; other meters of differing sizes are also provided, and the pressure drops across different sized meters will be different. However, in each case the increase in cross-sectional area will lead to a decrease in the pressure drop.

Flow Meter

FIG. 4 shows a flow meter incorporating the bidirectional fluidic oscillator flow tube as described above. The sensors 400 are connected to the flow meter hardware. The magnets 402 are positioned within the diffuser walls and are utilised to induce an electromagnetic field that is measured using the sensors 400. The output of the sensors 400 is processed by the flow meter hardware, and an output of the flow rate/flow volume is provided. The registers are used in determining the flow direction as described above. The processor is utilised to carry out the correction methods, and flow direction detection as described above. The associated memory is utilised to store, for example, the look-up table utilised in determining the flow rate.

While the invention has been described in reference to its preferred embodiments, it is to be understood that the words which have been used are words of description rather than limitation and that changes may be made to the invention without departing from its scope as defined by the appended claims.

Each feature disclosed in the description, and (where appropriate) the claims and drawings may be provided independently or in any appropriate combination.

The invention claimed is:

1. A flow tube for a bidirectional flow meter comprising:
a first means for generating a periodic pressure fluctuation whose frequency varies in dependence on the flow rate of fluid through the flow meter in a first direction;
a second means for generating a periodic pressure fluctuation whose frequency varies in dependence on the flow rate of fluid through the flow meter in a second direction, opposite to the first direction, each generating means comprising a diffuser; a splitter post; and two feedback channels;
connection means for connecting said first and second generating means in series between an inlet port and an outlet port; and
a long, thin paddle including an elongate body having a length to width ratio of between 2.5 to 30 and positioned downstream of the splitter post, arranged to reduce the backflow around the downstream end of the splitter post, wherein the diffuser comprises two bodies, and the angle between the two bodies is between 28° and 35°.

2. A flow tube according to claim 1, wherein said first generating means and said second generating means are substantially identical.

3. A flow tube according to claim 1, wherein the two said generating means are arranged such that the first and second generating means each have an inlet respectively, each inlet being defined when the fluid is flowing respectively in the first and second directions, said inlets of the first and second generating means being connected together.

4. A flow tube according to claim 1, in which the connection means comprised a throat positioned between the first and second generating means.

5. A flow tube according to claim 4, wherein the first generating means is adapted to condition the flow through the throat into the second generating means when the fluid is flowing in the second direction, and vice versa.

6. A flow tube according to claim 4, wherein the minimum cross-sectional area of the outlet port is greater than the cross-sectional area of the throat.

7. A flow tube according to claim 4, wherein the minimum cross-sectional area of the outlet port is greater than twice the cross-sectional area of the throat.

8. A flow tube according to claim 4, wherein the diffuser intake has a width which is greater than the width of the throat.

9. A flow tube according to claim 8, wherein the diffuser intake width is between 1.4 and 1.8 times the width of the throat, preferably between 1.5 and 1.7 times, more preferably approximately 1.64 times.

10. A flow tube according to claim 8, wherein the difference in intake width and throat width is between 2.0 mm and 2.5 mm, preferably approximately 2.3 mm.

11. A flow tube according to claim 8, wherein the diffuser comprises two, preferably elongate, bodies, and the angle between the two such bodies is adapted to substantially minimise the flow into the exits of the feedback channels.

12. A flow tube according to claim 8, wherein the shortest distance from the splitter post to an inlet of the generating means is between 6.0 and 7.0 times the width of the throat, preferably between 6.25 and 6.75, and more preferably approximately 6.4.

13. A flow tube according to claim 8, wherein the minimum cross-sectional area of the outlet port minus the cross-sectional area of the splitter post is greater than twice the cross-sectional area of the throat.

14. A flow tube according to claim 13, wherein the minimum cross-sectional area of the outlet port minus the cross-sectional area of the splitter post is greater than 2.01 times the cross-sectional area of the throat, preferably greater than 2.05 times.

15. A flow tube according to claim 1, wherein the shortest distance between the splitter post and an inlet to the generating means is between 22 mm and 24 mm, preferably approximately 23 mm.

16. A flow tube according to claim 1, wherein the splitter post is positioned at least partially within an exhaust of the diffuser.

17. A flow tube according to claim 1, wherein the shortest distance between the splitter post and one of the bodies is between 0.9 and 1.1 times the shortest distance between the bodies, and preferably is substantially equal to that distance.

18. A flow tube according to claim 1, wherein the inlet port and the outlet port each comprise a neck, and the flow tube further comprises an elongate body extending from the splitter post into the neck.

19. A flow tube according to claim 18, wherein said elongate body extends between 1.5 and 3.5 times the width of the throat, preferably between 2 and 3 times, and more preferably approximately 2.5 times.

20. A flow tube according to claim 18, wherein said elongate body extends between 5 mm and 15 mm, preferably 9 mm.

21. A flow tube according to claim 18, wherein said elongate body is between 0.20 and 0.40 times the width of the throat, preferably between 0.25 and 0.35 times, and more preferably approximately 0.28 times.

22. A flow tube according to claim 18, wherein said elongate body is between 0.5 mm to 2 mm thick, preferably approximately 1 mm.

23. A flow tube according to claim 1, wherein an inlet/outlet of the flow meter comprises a substantially parallel section.

24. A flow tube according to claim 23, wherein an inlet bore tapers to said substantially parallel section.

25. A flow tube according to claim 23, wherein the length of said substantially parallel section is between 2.0 and 2.5 times the width of the throat, preferably between 2.1 and 2.4 times, and more preferably approximately 2.22 times.

26. A flow tube according to claim 23, wherein said parallel section is between 6 mm and 10 mm in length, preferably approximately 8 mm.

27. A flow tube according to claim 23, wherein the transition between the tapered and parallel sections is filleted.

28. A flow tube as claimed in claim 1, in which the first means for generating a periodic pressure fluctuation comprises a first flow chamber, and in which the second means for generating a periodic pressure fluctuation comprises a second flow chamber.

29. A flow tube as claimed in claim 1, wherein the angle between the two such bodies is between between 30° and 34.

* * * * *

UNITED STATES PATENT AND TRADEMARK OFFICE
CERTIFICATE OF CORRECTION

PATENT NO. : 9,134,152 B2
APPLICATION NO. : 13/063714
DATED : September 15, 2015
INVENTOR(S) : Michael L. Sanderson et al.

It is certified that error appears in the above-identified patent and that said Letters Patent is hereby corrected as shown below:

On the title page
        Item (73) Assignee: "Elster Metering Limited, Luton (GB)" should be –Elster Water Metering Limited, Birmingham (GB)–

Signed and Sealed this
Twenty-third Day of August, 2016

Michelle K. Lee
*Director of the United States Patent and Trademark Office*